US008293333B2

(12) United States Patent
Croll et al.

(10) Patent No.: US 8,293,333 B2
(45) Date of Patent: Oct. 23, 2012

(54) AMMONIA-FREE GASEOUS AIR FILTER

(75) Inventors: Lisa M. Croll, Battersea (CA); Jeffrey R. Dahn, Upper Tantallon (CA); Allen R. Siedle, Lake Elmo, MN (US); Jock W. H. Smith, Halifax (CA); Philippe Westreich, New Castle, PA (US); Thomas E. Wood, Stillwater, MN (US)

(73) Assignees: Jeffrey R. Dahn, Nova Scotia (CA); 3M Innovative Properties Company, St. Paul, MN (US)

( * ) Notice: Subject to any disclaimer, the term of this patent is extended or adjusted under 35 U.S.C. 154(b) by 422 days.

(21) Appl. No.: 12/552,367

(22) Filed: Sep. 2, 2009

(65) Prior Publication Data

US 2010/0050583 A1 Mar. 4, 2010

Related U.S. Application Data

(60) Provisional application No. 61/093,636, filed on Sep. 2, 2008.

(51) Int. Cl.
*B01D 53/02* (2006.01)

(52) U.S. Cl. .................. 427/419.1; 55/DIG. 5; 55/524; 55/DIG. 33; 427/419.6; 427/430.1; 96/134; 96/153

(58) Field of Classification Search .................. 502/435; 252/181.1–181.7; 427/372.2–397.8, 419.1–419.8; 55/522–528, DIG. 5
See application file for complete search history.

(56) References Cited

U.S. PATENT DOCUMENTS

| 1,519,470 | A |  | 12/1924 | Wilson et al. |  |
|---|---|---|---|---|---|
| 1,956,585 | A |  | 5/1934 | Oglesby et al. |  |
| 2,511,288 | A |  | 6/1950 | Morrell et al. |  |
| 2,920,050 | A |  | 1/1960 | Blacet et al. |  |
| 2,920,051 | A |  | 1/1960 | Wiig et al. |  |
| 3,355,317 | A |  | 11/1967 | Keith, II et al. |  |
| 4,043,934 | A | * | 8/1977 | Shuler et al. | 502/1 |
| 4,187,282 | A | * | 2/1980 | Matsuda et al. | 423/244.1 |
| 4,212,852 | A |  | 7/1980 | Aibe et al. |  |
| 4,474,896 | A | * | 10/1984 | Chao | 502/216 |

(Continued)

FOREIGN PATENT DOCUMENTS

CS 149995 7/1973

(Continued)

OTHER PUBLICATIONS

Search Report dated Apr. 15, 2010 from International Application PCT/US/2009/055649.

(Continued)

*Primary Examiner* — Duane Smith
*Assistant Examiner* — Thomas McKenzie
(74) *Attorney, Agent, or Firm* — Karl G. Hanson

(57) ABSTRACT

A filter for removing contaminants from air. The filter includes (a) a substrate that does not have any volatile ammonia on the surface thereof; (b) copper that has been impregnated onto the substrate; and (c) molybdenum and/or tungsten that has been impregnated onto the substrate. The filter can be made using an aqueous solution(s) that contains one or more of a first copper salt and a second salt that include a polynuclear anion that contains molybdenum, tungsten, or both. Because the metals can be impregnated onto the substrate surface without using an ammonium-based solution, the need to manage ammonia off-gassing is avoided. Further, no volatile ammonia would be present on the resulting substrate surface.

14 Claims, 3 Drawing Sheets

U.S. PATENT DOCUMENTS

| | | | |
|---|---|---|---|
| 4,531,953 A | 7/1985 | Groose et al. | |
| 4,677,096 A | 6/1987 | van der Smissen | |
| 4,801,311 A | 1/1989 | Tolles | |
| 4,802,989 A | 2/1989 | Haruta et al. | |
| 5,063,196 A | 11/1991 | Doughty et al. | |
| 5,078,132 A | 1/1992 | Braun et al. | |
| 5,113,856 A | 5/1992 | van der Smissen | |
| 5,192,735 A | 3/1993 | Pagotto et al. | |
| 5,197,208 A | 3/1993 | Lapidus | |
| 5,231,063 A | 7/1993 | Fukumoto et al. | |
| 5,320,817 A | 6/1994 | Hardwick et al. | |
| 5,344,626 A | 9/1994 | Abler | |
| 5,492,882 A | 2/1996 | Doughty et al. | |
| 5,496,785 A | 3/1996 | Abler | |
| 5,696,199 A | 12/1997 | Senkus et al. | |
| 5,714,126 A | 2/1998 | Frund | |
| 6,234,171 B1 | 5/2001 | Springett et al. | |
| 6,344,071 B1* | 2/2002 | Smith et al. | 95/274 |
| 6,719,828 B1* | 4/2004 | Lovell et al. | 95/134 |
| 6,767,860 B2 | 7/2004 | Hern et al. | |
| 6,777,369 B1* | 8/2004 | Kuroda et al. | 502/211 |
| 7,004,990 B2 | 2/2006 | Brey et al. | |
| 7,048,781 B1* | 5/2006 | Lovell | 95/134 |
| 7,309,513 B2 | 12/2007 | Brey et al. | |
| 7,425,521 B2 | 9/2008 | Kaiser et al. | |
| 2004/0259729 A1* | 12/2004 | Kaiser et al. | 502/417 |
| 2004/0261385 A1* | 12/2004 | Brey et al. | 55/524 |
| 2006/0096911 A1 | 5/2006 | Brey et al. | |
| 2006/0107642 A1* | 5/2006 | Smith et al. | 55/524 |
| 2006/0229471 A1* | 10/2006 | Suzuki | 564/253 |
| 2006/0254427 A1 | 11/2006 | Trend et al. | |
| 2008/0271602 A1* | 11/2008 | Tatarchuk et al. | 95/135 |
| 2011/0197763 A1* | 8/2011 | Becue et al. | 95/129 |

FOREIGN PATENT DOCUMENTS

| | | |
|---|---|---|
| DE | 1087579 | 8/1960 |
| DE | 3231717 | 3/1984 |
| FR | 1605363 | 2/1975 |
| FR | 2532188 | 3/1984 |
| FR | 2728476 | 6/1996 |
| FR | 2764518 | 12/1998 |
| GB | 2010794 A | 7/1979 |
| GB | 2187725 A | 9/1987 |
| JP | 73-24984 | 8/1971 |
| KR | 2006-0042799 | 5/2006 |
| WO | WO 93/10896 | 6/1993 |
| WO | WO 96/22823 | 8/1996 |
| WO | WO 98/31460 | 7/1998 |

OTHER PUBLICATIONS

Grabenstetter, R.J. et al., *Military Problems with Aerosols and Nonpersistent Gases*, Chapter 4: Impregnation of Charcoal, Division 10 Report of US National Defense Research Committee (1946) pp. 40-87.

* cited by examiner

- - - - - US Pat. 7,309,513
― ― ― ― Calgon URC
――――― Example 1
――――― KUGC (Unimpregnated)

AMMONIA-FREE GASEOUS AIR FILTER

CROSS-REFERENCE TO RELATED APPLICATION

This application claims the benefit of U.S. Provisional Patent Application No. 61/093,636 filed Sep. 2, 2008.

BACKGROUND

Activated carbon, alumina, zeolites, and the like, are widely used in filtration appliances. These types of materials are sometimes referred to collectively as "active particulate"—see U.S. Pat. No. 5,696,199 to Senkus et al.—because of their configuration and innate ability to interact with fluids by sorbing (adsorbing and absorbing) components in the fluid. Their good filtration properties arise from a highly porous or convoluted surface structure, which provides an increased surface area.

Activated carbon, in particular, is widely used to protect persons from inhaling a variety of toxic or noxious vapors, including poisonous gases, industrial chemicals, solvents, and odorous compounds. Its surface porosity typically results from a controlled oxidation during manufacture. Activated carbon is derived, for example, from coal or coconut shells and can be produced in the form of powders, granules, and shaped products and it is commonly used in individual canisters or pads for gas masks. Important properties of commercial activated carbon products include those related to their particle size as well as their pore structure. See, KIRK-OTHMER ENCYCLOPEDIA OF CHEMICAL TECHNOLOGY, 4th Ed., John E. Wiley and Sons, 1992, Vol. 4, *Activated Carbon*, p. 1015-1037.

Although commonly used in many filters, activated carbon does not have a great capacity to remove gases and vapours that have low boiling points. Treatments therefore have been devised where chemicals are placed on and within the carbon pores to provide enhanced filtration capabilities for such gases and vapours. These treatment processes are generally known as "impregnation" methods, and the result of the treatment is an impregnated activated carbon.

Various impregnants have been developed for removing a wide range of chemicals. In industry—where the nature of the hazard is known in advance—the practice has been to select an appropriate filter for the known hazard. Consequently, filters that are effective at removing a specific chemical type or class are often used in industrial applications.

Over time, regulatory structures for the selection and use of respiratory protective equipment have been created, along with approval systems. The European Standard (EN) system has been adopted widely in Europe and elsewhere, and the National Institute for Occupational Safety and Health (NIOSH), which has been adopted in the USA, Canada, and other countries.

For emergency responders, filtration-based protection systems are appropriate for personnel who undertake various tasks close to a point of a chemical release. Although a quick response is often desirable, delay may be inevitable if the responders need to first identify the toxic component in the surrounding air in order to select an appropriate filter. To avoid carrying an inventory of many different filters, it may be beneficial to have one filter type, which can provide protection against various hazards.

The first U.S. patent that described a treated carbon, which removed a variety of gases arose from developments to protect personnel in World War I battles where chemical agents were used. The 1924 patent by Robert E. Wilson and Joshua C. Whetzel (U.S. Pat. No. 1,519,470) describes several methods of impregnating granular activated carbon with metals and their oxides. For most purposes, the preferred impregnants were metallic copper and copper oxides. The products made by the method described in this patent later became known as "whetlerites". Workers at Edgewood Arsenal made subsequent progress in techniques for copper impregnation, and by the early 1940s, a copper impregnated carbon, designated "Type A" whetlerite, was the standard canister fill for U.S. military masks. This sorbent was prepared by treating activated carbon with copper ammine carbonates in an ammonia solution. When the treated carbon was heated to 150° C. or higher, the ammine carbonates decomposed to form copper oxides in the carbon pores. Ammonia and carbon dioxide were liberated during drying. The oxide impregnant acted as an oxidizing and basic medium for the retention of acidic or oxidizable gases and vapors. The preparation of an impregnated particulate carbon of this type is described in U.S. Pat. No. 1,956,585 to Oglesby et al. It is now known, however, that active particulates treated with such copper compounds can react with hydrogen cyanide (HCN) to generate cyanogen (NCCN), an equally toxic gas. Other variations on the Wilson et al. technique have been developed—see, for example, the following patents: U.S. Pat. No. 2,920,051, DE 1,087,579, FR 1,605,363, JP 73-24984, and CS 149,995.

In a particular advance over the 1924 Wilson et al. activated carbon, chromium (VI) salts were used to aid in removal of the NCCN generated by reaction of HCN with copper based salts—see U.S. Pat. Nos. 1,956,585 and 2,920,050. In recent years, however, the use of such Cr-based materials has been limited by both environmental and health concerns. An in depth report on impregnant formulations can be found in "Military Problems with Aerosols and Nonpersistent Gases", Chapter 4: "Impregnation of Charcoal", by Grabenstetter, R. J., and Blacet, F. E., Division 10 Report of US National Defense Research Committee (1946) pp. 40-87. The favorable properties obtained by using chromium also can be realized by the use of metals such as molybdenum, vanadium, or tungsten. Whetlerites containing these metals are described in several patents, including U.S. Pat. Nos. 4,801,311 and 7,004,990.

Subsequent research also has explored shelf life improvements using impregnated organic compounds on carbon. One material found to give an apparent improvement in shelf life towards a cyanogen chloride (CK) challenge is triethylenediamine (also known by other names such as TEDA, DABCO, or 1,4-diazabicyclo[2.2.2]octane). Subsequently, it was found that when impregnated on carbon, TEDA is capable of reacting directly with cyanogen chloride and is also capable of removing methyl bromide and methyl iodide.

In 1993 Doughty et al. (U.S. Pat. No. 5,492,882) described the use of copper carbonates and sulfates in the presence of zinc and molybdenum oxides. This formulation was an advancement over the Wilson et al. work and others because it incorporated molybdenum oxides, which increased capacity for the hydrogen cyanide (HCN) reaction product cyanogen (NCCN) and avoided the use of chromium found in earlier versions. In addition, Doughty et al. removed basic gases such as ammonia. As discussed below, the Doughty et al. method is generally limited by its utilization of ammoniacal solutions and salts during the impregnation process. These chemicals and solutions are generally expensive to handle on a manufacturing scale because specialized ventilation and scrubbing equipment is required to meet health and safety concerns and environmental release standards.

In an adaptation of copper molybdenum chemistry taught by Doughty et, al., Kaiser et. al (U.S. Pat. No. 7,425,521) illustrate a multistep method for treating carbon monolith structures.

In U.S. Pat. No. 7,309,513, Brey et al. presented an advance by replacing the relatively expensive molybdenum compounds with tungsten while retaining the ability to remove NCCN and other basic gases such as ammonia. Despite this advance, Brey et al. also relied on the use of high pH, ammonia-based salts and solutions to impregnate metal into activated carbon and other substrates.

SUMMARY OF THE INVENTION

The present invention provides a new method of impregnating active substrates with copper, molybdenum, and other compounds or atoms. The new method comprises: (a) providing an aqueous solution that contains one or more of a first water soluble copper salt and that has a pH less than 8; (b) providing an aqueous solution that contains one or more of a second water soluble salt, which second salt includes a polynuclear anion that contains molybdenum, tungsten, or a combination thereof, which aqueous solution has a pH less than 8; wherein the aqueous solution that contains the first water soluble copper salt may be the same or different from the solution that contains the second salt; and (c) contacting the one or more solutions with a substrate such that (1) copper and (2) molybdenum or tungsten or a combination thereof become impregnated onto the substrate.

The invention also provides a new filter for removing contaminants from air. The new filter comprises: (a) a substrate that does not have any volatile ammonia on the surface thereof; (b) copper that has been impregnated onto the substrate; and (c) molybdenum and/or tungsten that has been impregnated onto the substrate.

The invention also provides a method of making an air filter, which method comprises: (a) providing an aqueous solution that contains a water-soluble copper salt and a water-soluble polynuclear anion that contains Cu, Mo, W, or a combination thereof; and (b) contacting the substrate with the aqueous solution such that Cu, Mo, W, or a combination thereof become impregnated onto the substrate.

The invention further provides a filter for removing contaminants from air, which filter comprises: (a) a substrate that does not have any volatile ammonia on the surface thereof; (b) copper that has been impregnated onto the substrate; and (c) molybdenum, tungsten, or a combination thereof, which has been impregnated onto the substrate A significant benefit of the present invention is the ability to use lower pH, non-ammonium based solutions and salts. Strongly basic ammoniacal solutions and ammonium-based salts have historically been relied on to solubilize the necessary metals—typically Cu and one or more of Cr, Mo, W, Zn, and Ag—and to ensure that the metals are distributed finely on the substrate surface. These ammoniacal solutions tend to be basic, that is, the pH of the ammoniacal solutions are above 7, usually above 9 and even above 10. To co-impregnate tungsten or molybdenum compounds using a basic copper complex also requires the molybdenum and tungsten compounds to be stable and soluble in a basic solution. Polynuclear molybdenum and tungsten compounds comprising polyoxometallates of molybdenum and tungsten tend to depolymerize at these high pHs so that the dissolution and solubilization process of such salts tends to be difficult, slow, and expensive. The present invention can overcome this drawback by utilizing solutions of low pH, and can, if desired, avoid use of copper ammine complexes entirely and, in so doing, lowers or avoids the use of ammoniacal solutions and ammonium-based salts, and thus allows a new filter to be produced, which lacks volatile ammonia on the substrate surface. Applicants' invention therefore does not need an additional processing step such as heating for purposes of removing residual ammonia from the substrate. Although a heating step is normally used to dry the substrate and activate the impregnants, prolonged heating is not needed for ammonia removal.

Using aqueous non-ammoniacal solutions is also advantageous because there is no need to manage ammonia off-gassing during product manufacture. In addition, low but detectable ammonia levels are released from the impregnated substrates that rely on the ammoniacal treatments during manufacture. Despite a generally low level of release, cases of irritation have been reported by respirator users, and the released ammonia may interfere with catalyst performance and other sorbents in multilayer filter beds. Further, in the absence of ammonium hydroxide or ammonium carbonate in the impregnating solution, many impregnation formulations suffer from precipitation of some or all of the metal ions as compounds or phases. The final product therefore may exhibit a decrease in capacity for removal of certain toxicants, including HCN. For example, known samples prepared from aqueous solutions that contain $CuCl_2$ and a Mo salt have been measured to have only a few minutes of HCN service life until NCCN breakthrough. This performance may stem from poor wetability of the metal salt solutions, particularly at high concentrations. Poor wetability, in turn, creates large crystallites of impregnant within the pore structure, rather than a fine metal distribution over the substrate surface, as is typically observed in active particulates that have the ability to remove multiple gases from air. In addition to the benefits listed above, the present invention can be prepared in a single imbibing step. The present invention accordingly provides a number of benefits over known processes for delivering copper and other metals onto active particulate substrate surfaces.

GLOSSARY

"ammonia" means $NH_3$;

"ammonia-free" means that essentially no ammonia has been present on the substrate;

"and/or" means "and", "or", and a combination of "and" and "or";

"anion" means a negatively charged ion;

"aqueous solution" means a homogeneous mixture that contains water and one or more solutes, which mixture does not contain a significant amount of ammonia;

"cation to oxo-anion metal ratio" means the ratio of the number of dissociated cations that are produced by dissolution of the molybdenum or tungsten-containing salt to the number of metal atoms in the oxo-anion produced by the dissolution of the salt in water, e.g., the cation to metal ratio of the salt $Na_6[H_2W_{12}O_{40}] \cdot 29H_2O$ is equal to 6 divided by 12 or equal to 0.5 since dissolution of this species yields 6 equivalents of $Na^+$ for the 12 tungsten atoms that are contained in each $[H_2W_{12}O_{40}]^{6-}$ oxo-anion that is generated by dissolution of the salt;

"filter" means a device that is designed to remove contaminants from a fluid;

"polynuclear" means containing more than two metal atoms;

"significant amount of ammonia" means the amount of ammonia in the impregnating solution is large enough to enable ammonia to be detected in the solution or in the resulting impregnated substrate;

"substrate" means any surface on which impregnants may be effective for their intended purpose;

"volatile" means capable of being released into air that passes through the filter at about 20° C., 80% humidity, and 1 atmosphere pressure; and "water soluble" means a molecule or compound can form a homogeneous solution when mixed with water.

DETAILED DESCRIPTION OF PREFERRED EMBODIMENTS

Figure 1:
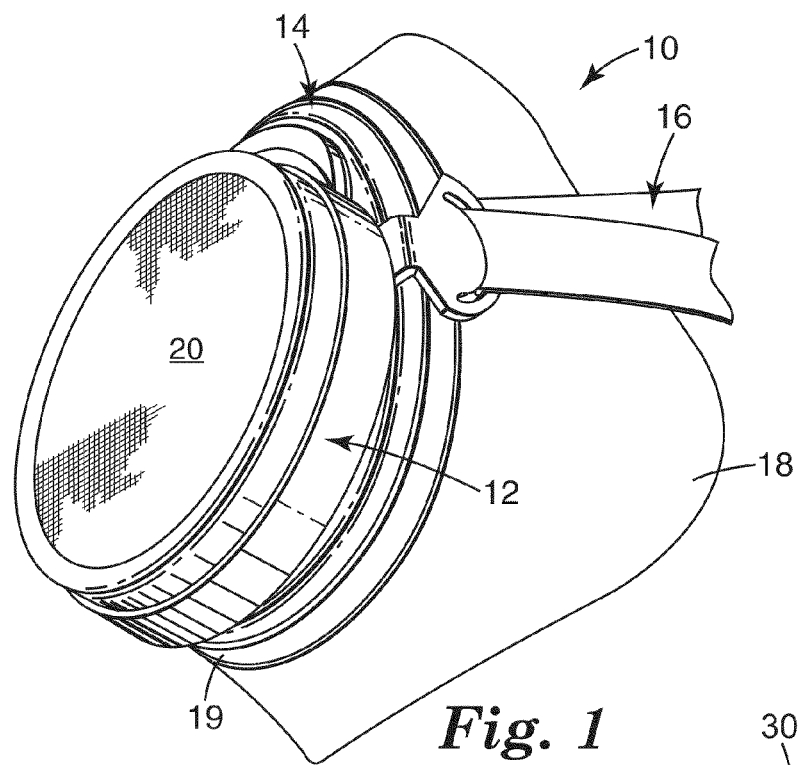
FIG. 1 is an example of a respirator 10 that may use a filter cartridge 12 in accordance with the present invention.

In the practice of the present invention, a gaseous air filter can be made using a process that comprises the steps of: (a) providing an aqueous solution that contains one or more of a first water soluble copper salt; (b) providing an aqueous solution that contains one or more of a second water soluble salt that includes a polynuclear anion that contains molybdenum, tungsten, or a combination thereof; wherein the aqueous solution that contains the first salt may be the same or different from the solution that contains the second salt; and (c) contacting a substrate with the one or more solutions such that (1) copper and (2) molybdenum or tungsten or a combination thereof become impregnated onto the substrate.

If desired, the first and second salt(s) may be dissolved in a single solution that is contacted to the substrate. Alternatively, a multi-step process may be used where each metal or metal-containing compound or phase is added stepwise until all the necessary metals or metal-containing compounds or phases have been contacted to the substrate, therefore avoiding the need to dissolve all of the metal compounds in a single solution. The substrate also could be imbibed and dried repeatedly with an aqueous solution of low metal content until the desired metal loading is achieved, thus avoiding the need to generate a high concentration aqueous solution from sparingly soluble metal salts. Although such process is theoretically possible, it could result in significantly higher manufacturing costs as a result of the multiple drying steps.

The substrate may be impregnated with the first and second metal salts by, for example, soaking the substrate in a solution that contain the respective metal salts. The first and second metal salts may be included in the solvent at about 0.02 to 20 percent by weight of the total solution. Alternatively, it may be possible for the substrate to be first soaked in a solution that contains the first copper salt and then soaked in a solution that contains the second salt that includes the polynuclear anion or vice versa. Water is the desired solvent used in impregnating the substrate with the metal compounds. Water is beneficial in that it is environmentally friendly and is readily available. Other liquids such as $HNO_3$ also can be added to the aqueous solution. The aqueous solutions used typically will have a pH of less than 8, typically less than 7, more typically less than 6 and still more typically less than 4.

As an alternative to soaking or immersing the substrate in the solution(s), spraying techniques also may be used where the respective solutions are sprayed onto the substrate to impregnate the metal thereon. In addition, the substrate could be contacted with the solution(s) by feeding it through a bath using a screw feeder. A shaking apparatus or mixing device also could be used to ensure good contact between the substrate and the solution. The solution is typically applied up to the "imbibing limit", which is the point at which the surface of the substrate constituent(s) is fully wetted. It is the maximum amount of solution that can be applied without causing run-off, similar to a sponge being full but not overflowing. The imbibing limit is also referred to as the incipient wetness point.

Although the substrate can be dried after each impregnation, it is preferred that the substrate only be dried after the final impregnation. Drying may require further handling of the substrate, which, in turn, may cause abrasion, which can detrimentally affect the filter performance. Thus, the number of drying steps is desirably kept to a minimum. After being impregnated, the substrate typically is not washed with water or other solvents because such washing steps could remove the impregnated species. One method of drying is to heat the substrate. The substrate could be heated at atmospheric pressure or in a vacuum. Typically, the substrate is heated up to about 250° C., more typically up to about 175 to 225° C. The heating typically occurs in an inert atmosphere. An oven or a conveyer or a vessel could be used as the chamber where heating occurs. The inert atmosphere may comprise argon, nitrogen, carbon dioxide, and mixtures thereof and less than about 2% oxygen by weight. The use of an inert atmosphere allows the impregnant (for example, $Cu(NO_3)_2$,) to thermally decompose to the desired phase without damaging the activated particulate substrate. The drying temperature that is used can influence the identity of the copper-containing phase that is obtained, as well as the function of the impregnated substrate.

After the impregnation, and typically after drying, the substrate can be used to remove gaseous contaminants from air. The gaseous contaminants that can be removed include compounds such as hydrogen cyanide (HCN), cyanogen (NCCN), basic gases such as ammonia ($NH_3$), acid gases such as sulfur dioxide ($SO_2$) and organic vapours.

Examples of the first metal salts that may be used in connection with the present invention include, $Cu(NO_3)_2$, $CuCl_2$, $CuBr_2$, $Cu(O_2CH)_2$ and $Cu(O_2CCH_3)_2$ and combinations and hydrates thereof. A preferred copper salt comprises a nitrate anion. Additional metal salts can be used in admixture with the copper salts as described above. These additional salts include iron, nickel, and zinc nitrates, chlorides and carboxylates and soluble silver salts. Examples of the second metal salts include soluble salts comprising polyoxometallates of molybdate or tungstate anions wherein the metal-oxo anion portion of the salts contain greater than two molybdenum or tungsten atoms or a combination of more than two molybdenum and tungsten atoms. In these polyoxometallate salts, the cation to oxo anion metal ratio is less than one, and more typically less than or equal to 0.86. In addition to molybdenum and tungsten, the second metal salts may contain an additional element, for example, cobalt, boron, silicon, phosphorus, germanium, and/or iron. Typically, this additional element is silicon or phosphorus.

Historically, strongly basic molybdenum and tungsten compounds have been used in the known ammoniacal solutions. These basic salts have high cation to oxo-anion metal ratios, where the oxo-anion metal is molybdenum or tungsten or mixtures of both such as sodium molybdate or sodium tungstate, $Na_2MoO_4$ or $Na_2WO_4$ wherein the cation to oxo-anion metal ratio is 2 Lowering the cation to oxo-anion metal ratio is desired in the present invention since the addition of inert cations such as sodium, potassium, or ammonium provide little benefit for gas removal and increase the weight and can lower the sorptive capacity of the final product.

Representative examples include salts comprising compositions of the stoichiometries $H_3PMo_{12}O_{40} \cdot xH_2O$, $H_3PW_{12}O_{40} \cdot xH_2O$, $Na_3PW_{12}O_{40} \cdot xH_2O$, $Na_2PW_{12}O_{40} \cdot xH_2O$, $Na_3PMo_{12}O_{40} \cdot xH_2O$, $Na_3SiMo_{12}O_{40} \cdot xH_2O$, $H_4SiW_{12}O_{40} \cdot xH_2O$, $H_4SiMo_{12}O_{40} \cdot xH_2O$, $(NH_4)_6H_2W_{12}O_{42} \cdot xH_2O$, $(NH_4)_6H_2W_{12}O_{40} \cdot xH_2O$, and $(NH_4)_6Mo_7O_{24} \cdot 4H_2O$, where x represents a variable number of waters of hydration. The cation portion of these salts can comprise any cation that allows solubility of the polyoxometallate anion in water. These cations can include alkaline metal cations such as $Na^+$, $K^+$ and $Li^+$, as well as ammonium and hydronium cations and combinations of these cations. The second metal salt includes those that generate phosphomolybdate, phosphotungstate, silicomolybdate or silicotugstate anions in solution.

The substrate typically will have a surface that is sufficiently convoluted or porous, preferably at a microscopic and/or macroscopic level, such that the substrate is capable of being impregnated with at least about 5%, typically at least about 20%, more typically between about 20 and 30% by weight on a cumulative basis of at least the copper, molybdenum, and/or tungsten metals. Copper is typically present on the substrate at least 3% by weight, and more typically at least 5% weight and still more typically about 7-15% by weight. Molybdenum and or tungsten is typically present on the substrate at least 0.5% by weight, and more typically at least 1% weight and still more typically about 2-5% by weight. Substrate examples include woven or nonwoven fabric, bonded, fused, or sintered block, extended surface area particles, and/or the like. Suitable extended surface area substrate particles tend to have BET specific surface areas of at least about 85 square meters per gram ($m^2/g$), more typically at least about 500 $m^2/g$ to 2000 $m^2/g$, and typically about 900 $m^2/g$ to about 1500 $m^2/g$. The BET specific surface area of particles may be determined by a procedure described in ISO 9277:1995, incorporated herein by reference in its entirety.

Representative examples of extended surface area substrates include active particulate such as activated carbon, zeolite, alumina, silica, particulate catalyst supports, combinations of these, and the like. The substrate particles used as a host for the impregnants may be the same or different. Often the active particulate includes activated carbon, which may be derived from a wide variety of source(s) including coal, coconut, peat, combinations of any of these, and the like.

The active particulate substrates typically may have microporous, mesoporous, and/or macroporous characteristics as such are defined in applicable provisions of IUPAC Compendium of Chemical Technology, 2nd Ed. (1997). A typical population of activated particulate tends to include a combination of microporous, mesoporous, and macroporous properties. Typically, at least a portion of the active particulate is macroporous, for example when the filter media particles are treated by a method that comprises the steps of solution impregnation followed by vacuum treatment. In such embodiments, the impregnants are able to impregnate more thoroughly and completely into the pore structure of the substrate.

Extended surface area substrates may have any of a wide range of sizes. Substrate particle size in the filter industry generally is expressed in terms of a mesh size. A typical expression for mesh size is given by "a×b", wherein "a" refers to a mesh density through which substantially all of the particles would fall through, and "b" refers to a mesh density that is sufficiently high so as to retain substantially all of the particles. For example, a mesh size of 12×30 means that substantially all of the particles would fall through a mesh having a mesh density of 12 wires per inch, and substantially all of the particles would be retained by a mesh density having a density of 30 wires per inch. Active particulate characterized by a mesh size of 12×30 would include a population of particles that have a diameter of about 0.5 to 1.5 mm.

Selecting an appropriate mesh size for the substrate particles involves balancing density and filter capacity against air flow resistance. Generally, a finer mesh size (i.e., smaller particles) tends to provide not only greater density and filter capacity, but higher air flow resistance. Balancing these concerns, "a" is typically about 5 to 20 and "b" is typically about 15 to about 40, with the proviso that the difference between a and b is generally in the range from about 5 to about 30, for use in a standard respirator filter. Specific mesh sizes found to be suitable in the practice of the present invention include 12×20, 12×30, 12×35 and 12×40. However the current invention is not limited to the described mesh size and could be applied to any size substrate.

The substrate also could be a microreplicated surface having the structure described, for example, in U.S. Pat. No. 6,290,685 to Insley et al. In addition to one or more impregnates that contain metals, the filter media particles may optionally include one or more other kinds of impregnants. For example, one or more higher molecular weight amine functional impregnants may be beneficially incorporated. These materials are described as higher molecular weight amines since they have molecular weights much higher than that of ammonia (molecular weight of approximately 17) and as such have a lower volatility.

Suitable amines are either a solid or liquid at room temperature. Amines tend to provide cyanogen chloride (CK), methyl bromide, and/or methyl iodide removal capability. Representative examples of suitable amines include triethylenediamine (TEDA), triethylamine (TEA), pyridine, pyridine-4-carboxylic acid (P4CA), combinations of these, and the like. TEDA is particularly suitable for CK removal.

The amount of amine incorporated into the active particulate may vary within a wide range. Generally if too little is used, the CK lifetime of the resultant filter may be below what is desired. On the other hand, using too much amine may tend to degrade unduly the capacity of the filter to remove organic vapours from the air or other gases. Additionally, above some impregnation level, little additional benefit may be observed by the use of more amine. Balancing these concerns, the filter generally comprise of 0.5 to 15, more preferably, 1 to 5 weight percent of amine based upon the total weight of the impregnated substrate material.

Water may be a desirable, optional impregnant in some embodiments. Water can be added to the impregnated substrate after it has been treated with other impregnants, such as metals and amines. Water impregnant can provide increasing filtering efficacy against acid gases, ammonia, and the like. When present, 0.2 to 10, preferably 1 to 5, weight percent water would be suitable based upon the total weight of the impregnated substrate material. Other suitable impregnants are described in "Military Problems with Aerosols and Non-persistent gases, Summary of Technical Report of Division 10", NDRC (1946), the entirety of which is incorporated herein by reference.

The impregnated substrates used in filters of this invention may be used alone or in conjunction with other gaseous filtering media. When used in conjunction with other gaseous filtering media, the two or more types of media may be intermixed and/or disposed in separate filter bed layers. The relative amounts of each kind of gaseous filtering particle can vary over a wide range. Examples of such filter constructions can be found, for example, in U.S. Pat. No. 6,344,071 to Smith et al and U.S. Pat. No. 5,714,126 to Frund.

FIG. 1 shows a respirator 10 that has a filter cartridge 12 attached to a mask body 14. The filter cartridge 12 includes one or more layers of the air filter of the present invention. The respirator 10 also has a harness 16, which assists in supporting the mask body 14 over the nose and mouth of the wearer. The mask body 14 includes an elastomeric face-contacting portion 18 and a rigid structural portion 19. The filter cartridge 12 attaches to the rigid structural portion 19 and can be replaceable if desired.

Figure 2:
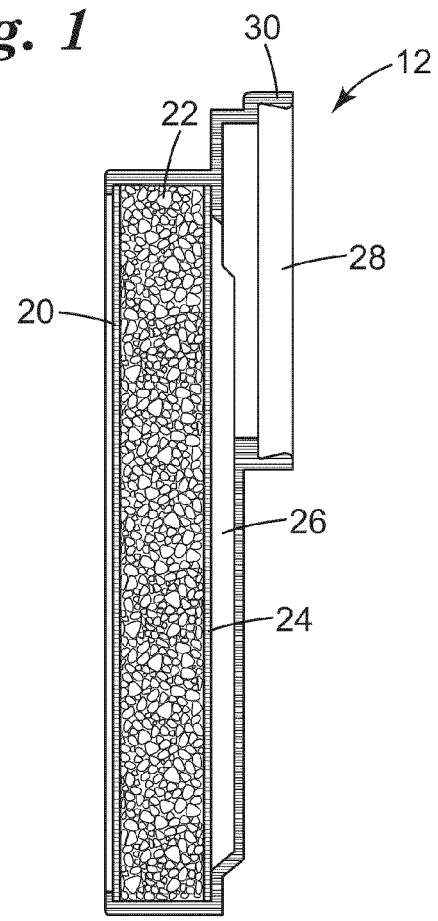
FIG. 2 is a cross-section of the filter cartridge 12 that may be used in connection with the present invention.

As shown in FIG. 2, the filter cartridge 12 may include a scrim or cover web 20 that extends across the cartridge inlet. A layer of an impregnated active particulate filter 22 is disposed between the cover web 20 and an outlet web 24 as a gaseous filtration layer, particularly suited for removing gas and vapor contaminants from air. The gaseous filtration layer 22 may be, for example, a packed bed, a bonded sorbent structure, an entangled structure, and/or an adhered structure. See, for example, U.S. Pat. No. 5,078,132 to Braun et al., U.S. Pat. No. 5,696,199 to Senkus et al., U.S. Pat. No. 6,234,171 to Springett et al. and US Patent Applications 2006/0254427 to Trend et al. and 2006/0096911 to Brey et al. Inhaled air thus passes sequentially through the cover web 20, the sorbent air filter 22, and the outlet scrim 24 to enter a plenum 26. From the plenum 26, the inhaled air then passes through an outlet 28 to enter the interior gas space where the purified air may be inhaled by the wearer. The filter cartridge 12 may include a removable attachment portion 30. The cartridge may be attached to the mask body using, for example, a snap-fit engagement mechanism as taught in U.S. Patent RE39,493 to Yuschak et al. or it may be, for example, a bayonet or threaded attachment. The filter cartridge 12 also may include a particle filter, typically upstream to the activated carbon filter 22. The particle filter may be disposed between the cover web 20 and the sorbent layer 22 or it may be used in lieu of the cover web 20.

A particle filter may come in a variety of forms, an example of which is a nonwoven electrically-charged fibrous web. A particle filtration layer is typically chosen to achieve a desired filtering effect and, generally, removes a high percentage of particles suspended in the gaseous stream that passes through it. For fibrous particle filter layers, the fibers selected depend on the substance to be filtered and, typically, are chosen so that they do not become bonded together during the molding operation. The particle filter layer may come in a variety of shapes and forms but typically has a thickness of about 0.2 millimeters (mm) to 1 centimeter (cm), more typically about 0.3 mm to 0.5 cm, and it could be a generally planar web or it could be corrugated to provide an expanded surface area—see, for example, U.S. Pat. Nos. 5,804,295 and 5,656,368 to Braun et al. The particle filtration layer also may include multiple filtration layers joined together by an adhesive or any other suitable means. Essentially any suitable material that is known (or later developed) for forming a particle filtering layer may be used for the filtering material. Webs of melt-blown fibers, such as those taught in Wente, Van A., *Superfine Thermoplastic Fibers*, 48 INDUS. ENGN. CHEM., 1342 et seq. (1956), especially when in a persistent electrically charged (electret) form are especially useful (see, for example, U.S. Pat. No. 4,215,682 to Kubik et al.). These melt-blown fibers may be microfibers that have an effective fiber diameter less than about 20 micrometers (μm) (referred to as BMF for "blown microfiber"), typically about 1 to 12 μm. Effective fiber diameter may be determined according to Davies, C. N., *The Separation Of Airborne Dust Particles*, INSTITUTION OF MECHANICAL ENGINEERS, London, Proceedings 1B, 1952. Particularly preferred are BMF webs that contain fibers formed from polypropylene, poly(4-methyl-1-pentene), and combinations thereof. Electrically charged fibrillated-film fibers as taught in van Turnhout, U.S. Pat. No. Re. 31,285, also may be suitable, as well as rosin-wool fibrous webs and webs of glass fibers or solution-blown, or electrostatically sprayed fibers, especially in microfilm form. Electric charge can be imparted to the fibers by contacting the fibers with water as disclosed in U.S. Pat. No. 6,824,718 to Eitzman et al., U.S. Pat. No. 6,783,574 to Angadjivand et al., U.S. Pat. No. 6,743,464 to Insley et al., U.S. Pat. Nos. 6,454,986 and 6,406,657 to Eitzman et al., and U.S. Pat. Nos. 6,375,886 and 5,496,507 to Angadjivand et al. Electric charge also may be imparted to the fibers by corona charging as disclosed in U.S. Pat. No. 4,588,537 to Klasse et al. or by tribocharging as disclosed in U.S. Pat. No. 4,798,850 to Brown.

The cover web (inlet and outlet) typically does not provide any substantial filtering benefits to the particle filtering structure, although it can protect the particle filtration layer and may act as a pre-filter when disposed on the exterior (or upstream to) the particle filtration layer. The cover web may be fashioned to have a basis weight of about 5 to 50 g/m$^2$ (typically 10 to 30 g/m$^2$). Fibers used in the cover web often have an average fiber diameter of about 5 to 24 micrometers, typically of about 7 to 18 micrometers, and more typically of about 8 to 12 micrometers.

Suitable materials for the cover web are blown microfiber (BMF) materials, particularly polyolefin BMF materials, for example polypropylene BMF materials (including polypropylene blends and also blends of polypropylene and polyethylene). A suitable process for producing BMF materials for a cover web is described in U.S. Pat. No. 4,013,816 to Sabee et al. The web may be formed by collecting the fibers on a smooth surface, typically a smooth-surfaced drum. Spunbond fibers also may be used.

A typical cover web may be made from polypropylene or a polypropylene/polyolefin blend that contains 50 weight percent or more polypropylene. Polyolefin materials that are suitable for use in a cover web may include, for example, a single polypropylene, blends of two polypropylenes, and blends of polypropylene and polyethylene, blends of polypropylene and poly(4-methyl-1-pentene), and/or blends of polypropylene and polybutylene. One example of a fiber for the cover web is a polypropylene BMF made from the polypropylene resin "Escorene 3505G" from Exxon Corporation, providing a basis weight of about 25 g/m$^2$ and having a fiber denier in the range 0.2 to 3.1 (with an average, measured over 100 fibers of about 0.8). Another suitable fiber is a polypropylene/polyethylene BMF (produced from a mixture comprising 85 percent of the resin "Escorene 3505G" and 15 percent of the ethylene/alpha-olefin copolymer "Exact 4023" also from Exxon Corporation) providing a basis weight of about 25 g/m$^2$ and having an average fiber denier of about 0.8. Suitable spunbond materials are available, under the trade designations "Corosoft Plus 20", "Corosoft Classic 20" and "Corovin PP-S-14", from Corovin GmbH of Peine, Germany, and a carded polypropylene/viscose material available, under the trade designation "370/15", from J. W. Suominen OY of Nakila, Finland. Examples of cover webs that may be used in the present invention are disclosed, for example, in U.S. Pat.

No. 6,041,782 to Angadjivand, U.S. Pat. No. 6,123,077 to Bostock et al., and WO 96/28216A to Bostock et al.

EXAMPLES

Gas Testing Methods
General:

Activated carbon substrates were preconditioned before testing by either drying to constant mass or humidifying to constant mass in a chamber that contained a salt slurry that generated about 85% relative humidity (RH) environment. The salt-slurry included 500 grams (g) of KBr in 100 milliliters (ml) deionized (DI) water. Samples labeled "dry" were dried to constant mass and then tested with a less than 15% RH challenge gas stream. The challenge gas was air that included $SO_2$, $NH_3$, HCN, or cyclohexane ($C_6H_{12}$). Samples labeled as "wet" were humidified to constant mass and were then tested with an 80% RH challenge gas stream. Samples labeled dry-wet were dried to constant mass and were then tested with an 80% RH challenge gas stream.

Figure 3:
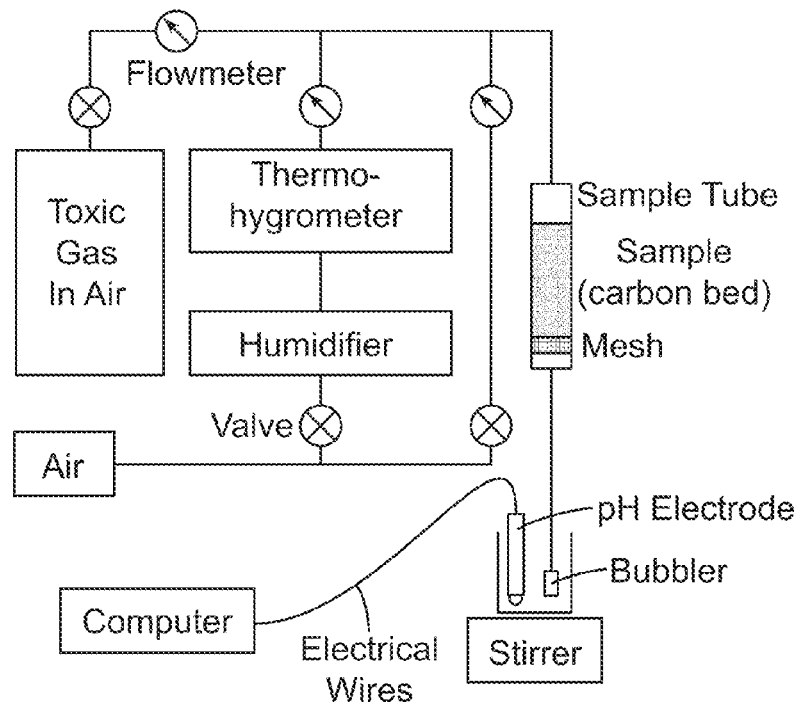
FIG. 3 is a schematic drawing of the tube-testing apparatus that is used for $SO_2$ and $NH_3$ Breakthrough testing.

$SO_2$ Breakthrough Testing:

A small sample of impregnated carbon, equating to the volume of 0.75 g of Kuraray GC, was weighed out and transferred to a tube testing apparatus having the configuration shown in FIG. 3. The carbon was "tapped" until no significant reduction in volume was observed by the human eye. The carbon sample in the tube was then exposed to a test stream of 200 mL/min of conditioned air (<15% RH or 80% RH) containing 1000 parts per million (ppm) of sulfur dioxide ($SO_2$). The air downstream to the activated carbon sample was bubbled into 100 mL of scrubbing solution (which consisted of distilled water and about 0.5 g of KCl or NaCl). The pH of the scrubbing solution was monitored using a pH electrode for $SO_2$ breakthrough. The breakthrough time was defined as the time at which a concentration of 36 ppm $SO_2$ was observed downstream to the carbon sample.

$NH_3$ Breakthrough Testing:

A small sample of impregnated carbon, equating to the volume of 0.75 g of Kuraray GC, was weighed out and transferred the tube testing apparatus shown in FIG. 3. The carbon was "tapped" until no significant reduction in volume was observed by the human eye. The carbon sample in the tube was then exposed to a test stream of 200 mL/min of conditioned air (<15% RH or 80% RH) containing 1000 ppm of ammonia ($NH_3$). The air downstream to the carbon sample was bubbled into 100 mL of scrubbing solution (which consisted of distilled water and about 0.5 g of KCl or NaCl). The pH of the scrubbing solution was monitored using a pH electrode for $NH_3$ breakthrough. The breakthrough time was defined as the time at which a concentration of 3.6 ppm is observed downstream to the carbon sample.

HCN Breakthrough Testing:

A small sample of impregnated carbon, equating to the volume of 0.75 g of Kuraray GC was weighed out and transferred to a tube testing apparatus similar to the apparatus shown in FIG. 3 but with a gas chromatograph with a flame ionization detector (GC-FID). The carbon was "tapped" until no significant reduction in volume was observed to the human eye. The carbon sample in the tube was then exposed to a test stream of approximately 250 mL/min of conditioned air (<15% RH or 80% RH) that contained about 2000 ppm of hydrogen cyanide (HCN). The air downstream to the carbon sample was monitored for breakthrough using a GC-FID system for both HCN, the challenge gas, and cyanogen (NCCN), a common decomposition product of HCN. The breakthrough time was defined as the time at which a concentration of 5 ppm was observed downstream to the carbon sample.

$C_6H_{12}$ Breakthrough Testing:

A small sample of impregnated carbon, equating to the volume of 0.75 g of Kuraray GC was weighed out and transferred to a tube testing apparatus similar to the apparatus shown in FIG. 3 but with a Fourier Transform Infrared Spectrometer (FT-IR). The carbon was "tapped" until no significant reduction in volume was observed to the human eye. The carbon sample in the tube was then exposed to a test stream of approximately 200 mL/min of conditioned air (<15% RH) that contained about 2000 ppm of cyclohexane ($C_6H_{12}$). The air down stream to the carbon sample was monitored for breakthrough using a FT-IR system for $C_6H_{12}$. The breakthrough time was defined as the time at which a concentration of 5 ppm was observed downstream to the carbon sample.

Figure 4:
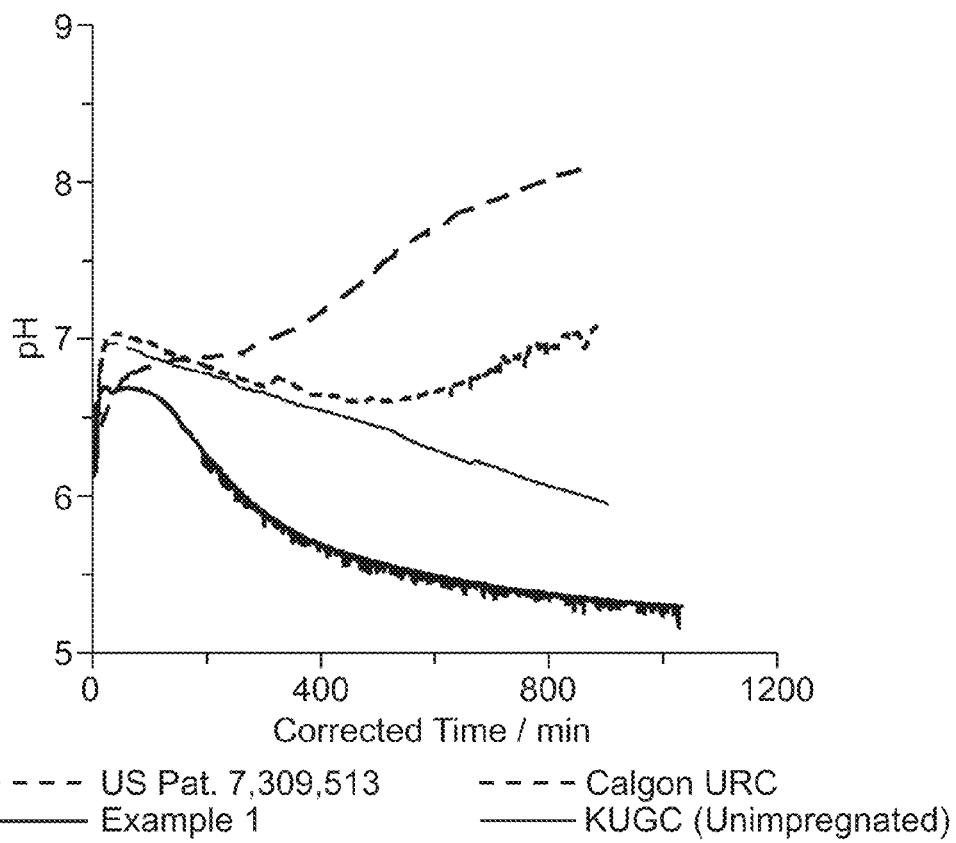
FIG. 4 is a plot of the output from the Ammonia Desorption Test.

Ammonia Desorption Test:

A small sample of impregnated carbon, equating to the volume of 0.75 g of Kuraray GC was weighed out and transferred to the tube testing apparatus shown in FIG. 3. The carbon was "tapped" until no significant reduction in volume was observed to the human eye. The carbon sample in the tube was then exposed to a test stream of approximately 200 mL/min of conditioned air (80% RH). The air downstream to the carbon sample was bubbled into 100 mL of scrubbing solution that consisted of distilled water and about 0.5 g of KCl or NaCl. The pH of the scrubbing solution was monitored using a pH electrode. All samples tested show an initial increase in pH as a result of the dissolution of air gases. A subsequent (at or after 400 minutes) increase in pH was interpreted as loss of a basic compound, such as ammonia, from the sample being tested and a decrease in pH at this later stage was attributed to dissolution of $CO_2$, from the air stream, into the scrubbing solution. This is illustrated in FIG. 4.

Impregnation Methods:

The selected salts were dissolved in water at the desired concentration. Dry or acid impregnated activated carbon was then impregnated with enough salt solution to reach its imbibing limit. This allowed the granules to begin to stick together. After imbibing with the salt solution, the carbon was then dried at the chosen temperature.

Figure 5A:
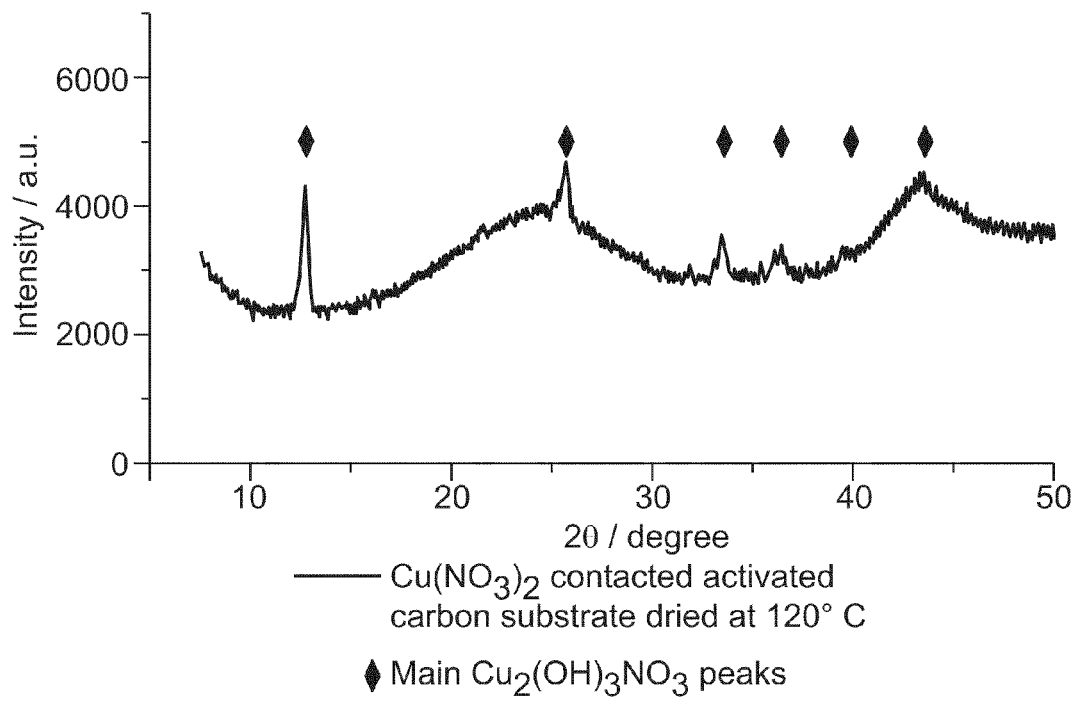
FIGS. 5a and 5b illustrates X-ray diffraction patterns of activated carbon samples that were contacted with aqueous solutions containing $Cu(NO_3)_2$. (a.u, means arbitrary units, and "theta ($\theta$)" means the scattering angle, the angle between the incident and diffracted x-ray directions).

The impregnated carbons were dried in an argon atmosphere. For instance, the activated carbon substrates that were contacted with aqueous $Cu(NO_3)_2$ containing solutions and were dried at maximum final drying temperatures of about 80° C. to 130° C. were observed to have copper nitrate hydroxide ($Cu_2(OH)_3NO_3$) present on the activated carbon substrate. As the final heating temperature was increased in this range, there was an increasing conversion of the $Cu(NO_3)_2$ to $Cu_2(OH)_3NO_3$ as the dominant impregnant phase. This was accompanied by a decrease in $NH_3$ uptake capacity. The presence of $Cu_2(OH)_3NO_3$ as the dominant impregnant phase was confirmed using powder X-ray diffraction. The diffraction patterns for CuO and $Cu(NO_3)(OH)_3$ were obtained from file numbers 05-0661 and 45-0594, respectively of the Joint Commission on Powder Diffraction Standards (JCPDS) of the International Centre for Diffraction Data (ICDD) Database version 2.16. The ICDD is located at Newtown Square, Pa., USA. An X-ray diffraction pattern of an activated carbon substrate that was contacted with aqueous $Cu(NO_3)_2$ containing solution, and then dried at 120° C. is shown in FIG. 5a.

Heating above 130° C. caused increasing amounts of CuO to be formed on the activated carbon substrate, resulting in a mixture of impregnant phases. Heating to about 190° C.-220° C. converted some or all of the impregnant to the CuO phase.

Impregnated activated carbon samples that had $Cu_2(OH)_3NO_3$ as the dominant impregnant phase and also contained a polynuclear molybdenum or tungsten anion exhibited good filtration capacity for $SO_2$, $NH_3$, and HCN, and less for NCCN. Impregnated activated carbons that were dried in an inert atmosphere at temperatures that resulted in the conversion of the $Cu(NO_3)_2$ impregnant to $Cu_2(OH)_3NO_3$ are described below in Examples 10 and 11. Flow test results obtained from these samples were typical of the results obtained from $Cu_2(OH)_3NO_3$ impregnated activated carbons that also were impregnated with a salt solution comprising a polynuclear molybdenum anion. These results are listed below in Table 1.

Figure 5B:
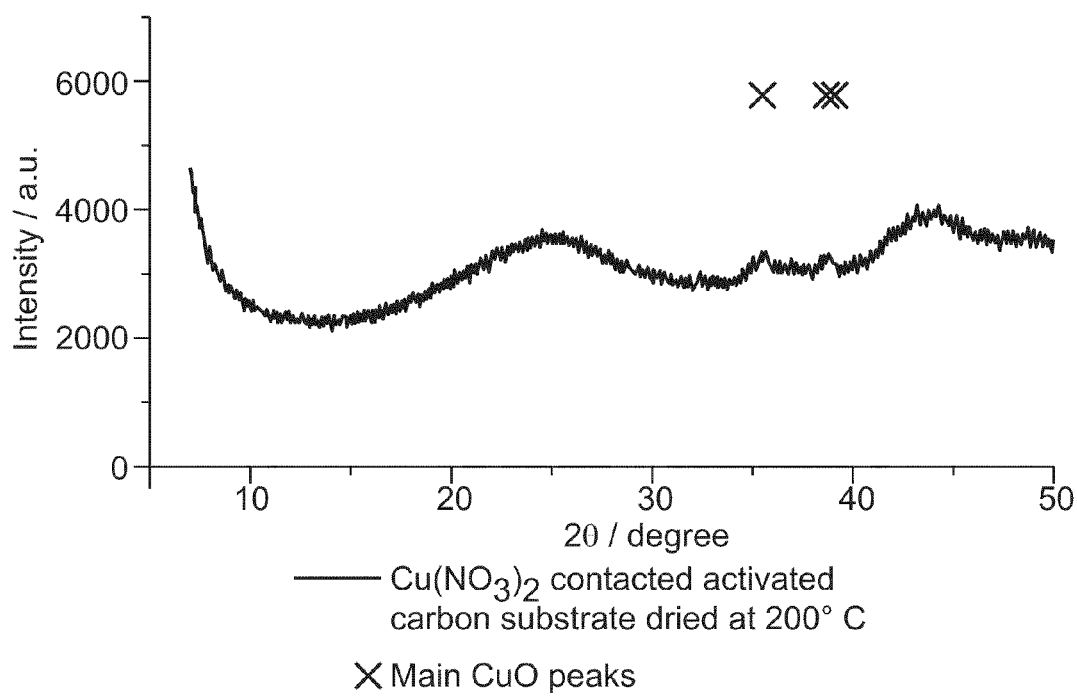

Activated carbon substrates that were contacted with aqueous $Cu(NO_3)_2$ containing solutions and were dried at maximum final drying temperatures of about 190° C. to 220° C. were observed to have copper oxide (CuO) present as a dominant impregnant phase on the activated carbon substrate. This was confirmed using powder X-ray diffraction (matching to ICDD PDF-2 entry #00-089-5898). An X-ray diffraction pattern of an activated carbon substrate that was contacted with aqueous $Cu(NO_3)_2$ containing solution and dried at 200° C. is shown in FIG. 5b. Impregnated activated carbon samples that had CuO as the dominant impregnant phase and also contained a polynuclear molybdenum or tungsten anion exhibited good filtration capacity for $SO_2$, $NH_3$, and HCN, as well as NCCN gas. Impregnated activated carbons that were dried, in inert atmospheres, at temperatures which resulted in the conversion of the $Cu(NO_3)_2$ impregnant to CuO are described below in Examples 1b-9 and 12-14.

In FIGS. 5a and 5b, the main Bragg peak positions of CuO and $Cu_2(OH)_3NO_3$ are indicated for reference. CuO is indicated in FIG. 5b, and $Cu_2(OH)_3NO_3$ is indicated in FIG. 5a.

Solution Preparation Methods

A solution that contained $HNO_3$ was prepared by diluting 70% concentrated reagent grade $HNO_3$ purchased from Sigma-Aldrich, St. Louis, Mo., USA, in distilled water.

A solution that contained $Cu(NO_3)_2$ was prepared by dissolving the desired amount of $Cu(NO_3)_2.2.5H_2O$ or equivalently $Cu(NO_3)_2.3H_2O$ (A.C.S. grade), purchased from Alfa Aesar, Ward Hill, Mass., USA, in distilled water.

A solution that contained $CuCl_2$ solutions was prepared by dissolving the desired amount of $CuCl_2.2H_2O$ (reagent grade), purchased from Sigma-Aldrich, St. Louis, Mo., USA in distilled water.

A solution that contained $Fe(NO_3)_3$ was prepared by dissolving the desired amount of $Fe(NO_3)_3.9H_2O$ (A.C.S. grade) from Anachemia, Montreal, Canada in distilled water.

A solution that contained $H_3PMo_{12}O_{40}.xH_2O$ was prepared by dissolving the appropriate amount of reagent grade molybdophosphoric acid hydrate $(H_3PO_4.12MoO_3.xH_2O)$ obtained from Alfa Aesar, Ward Hill, Mass., USA, in distilled water. The number of water molecules per complex, x, was determined by heating 45 mg of $H_3PO_4.12MoO_3.xH_2O$ in a TGA, in air, from room temperature to 600° C. at a scan rate of 5° C./min. Analysis of the data before and after heating allowed an estimate of $x=27\pm2$.

A solution that contained $H_3PW_{12}O_{40}.xH_2O$ was prepared by dissolving the appropriate amount of reagent grade phophotungstic acid hydrate $(H_3PW_{12}O_{40}.xH_2O)$ obtained from Sigma-Aldrich, St. Louis, Mo., USA, in distilled water. The number of water molecules per complex, x, was determined by heating 29 mg of $H_3PW_{12}O_{40}.xH_2O$ in a TGA, in air, from room temperature to 500° C. at a scan rate of 5° C./min. Analysis of the data before and after heating allowed an estimate of $x=22\pm2$.

A solution that contained $Na_3PMo_{12}O_{40}.xH_2O$ was prepared by dissolving the appropriate amount of technical grade phophomolybdic acid sodium salt hydrate $(Na_3PMo_{12}O_{40}.xH_2O)$ obtained from Fluka, of Japan, Sigma-Aldrich, CH-9471, Buchs, in distilled water. The number of water molecules per complex, x, was determined by heating 21 mg of $Na_3PMo_{12}O_{40}.xH_2O$ in a TGA, in air, from room temperature to 500° C. at a scan rate of 5° C./min. Analysis of the data before and after heating allowed an estimate of $x=19\pm2$.

A solution that contained $Na_3PW_{12}O_{40}.xH_2O$ was prepared by dissolving the appropriate amount of sodium phosphotungstate hydrate, (99.9+%) $(Na_3PW_{12}O_{40}.xH_2O)$ obtained from Aldrich, St. Louis, Mo., USA, in distilled water. The number of water molecules per complex, x, was determined by heating about 54 mg of $Na_3PW_{12}O_{40}.xH_2O$ in a TGA, in air, from room temperature to 500° C. at a scan rate of 5° C./min. Analysis of the data before and after heating allowed an estimate of $x=13\pm2$.

A solution that contained $H_4SiMo_{12}O_{40}.xH_2O$ was prepared by dissolving the appropriate amount of silicomolybdic acid, $(H_4SiO_4.12MoO_3.xH_2O)$ (undisclosed purity, for research purposes only) obtained from Aldrich, St. Louis, Mo., USA, in distilled water. The number of water molecules per complex, x, was determined by heating about 54 mg of $H_4SiO_4.12MoO_3.xH_2O$ in a TGA, in air, from room temperature to 500° C. at a scan rate of 5° C./min. Analysis of the data before and after heating allowed an estimate of $x=25\pm2$.

Example 1

An impregnated substrate of the present invention was produced by contacting activated carbon with an impregnating solution and drying the mixture at elevated temperatures. Activated carbon, type 12×35 Kuraray GC available from Kuraray Chemical Co., Ltd., Osaka, Japan, was used as the substrate. The final impregnation solution was prepared by mixing an acidic solution containing 4 molar (moles per liter: "M") $HNO_3$ in water with the metals salts to achieve concentrations of 2.4 M $Cu(NO_3)_2$ and 0.035 M $H_3PMo_{12}O_{40}.xH_2O$. The carbon and the impregnating solution were combined at a ratio of 1 g: 0.8 mL. This mixture was then dried in an argon atmosphere for 0.5 hours at 110° C., followed by 2 hours at an elevated temperature of 200° C.

Example 1b

Example 1b was prepared similarly to Example 1 except that two steps were used. In step 1, 7 mL of an aqueous solution of 1.6M $Cu(NO_3)_2$, 0.02 M $H_3PMo_{12}O_{40}.xH_2O$ and 4 M $HNO_3$ was contacted with 10 g of activated carbon. This mixture was then dried in argon for 0.5 hour at 110° C. and then 40 minutes at 170° C. After drying, the impregnated sample was contacted with a further 5 mL of an aqueous solution of 1.6M $Cu(NO_3)_2$, 0.02M $H_3PMo_{12}O_{40}.xH_2O$ and 4 M $HNO_3$. This doubly impregnated sample was dried in argon for 0.5 an hour at 110° C. followed by 2 hours at 200° C.

Example 2

Ten (10) g of Kuraray GC activated carbon was impregnated with 7 mL of an aqueous solution of 1.2 M $Cu(NO_3)_2$, 0.02M $H_3PMo_{12}O_{40}.xH_2O$ and 0.4M $CuCl_2$. This mixture was dried in argon at 110° C. for 0.5 hours and then 170° C. for 45 minutes. After drying, the impregnated carbon was contacted with 5 mL of a second aqueous solution of 1.2 M $Cu(NO_3)_2$, 0.02 M $H_3PMo_{12}O_{40}.xH_2O$ and 0.4M $CuCl_2$. This doubly impregnated carbon was dried in argon at 110° C. for 0.5 an hour, followed by 220° C. for 2 hours.

Example 3

A sample of Kuraray GC activated carbon was impregnated in a two step process. First a sample of the carbon was impregnated with a 5 M $HNO_3$ aqueous solution at a ratio of 0.8 mL of the nitric acid solution for each gram of the activated carbon. The impregnated carbon was dried in an inert atmosphere for 2 hours at 100° C. This treated carbon was then impregnated with 0.8 mL of a second aqueous solution that was 1.7 M $Cu(NO_3)_2$ and 0.02 M $H_3PMo_{12}O_{40}.xH_2O$ for each g of treated activated carbon. The twice impregnated carbon was dried in argon for 2 hours at a temperature of 200° C.

Example 4

Example 4 was prepared as described in Example 1 except the activated carbon used was CDND 1230 from Calgon Carbon Corporation, Pittsburgh, Pa.

Example 5

Example 5 was prepared in two steps as described in Example 1b except that the second salt was $H_3PW_{12}O_{40}.xH_2O$ instead of $H_3PMo_{12}O_{40}.xH_2O$. In each imbibing step, 10 g of activated carbon was contacted with 8 ml of an aqueous solution that was 1.2M $Cu(NO_3)_2$, 0.016M $H_3PW_{12}O_{40}.xH_2O$ and 2.0 M $HNO_3$.

Example 6

Example 6 was prepared as described in Example 1 except the activated carbon used was Kuraray GG available from Kuraray Chemical Co.

Example 7

Example 7 was prepared as described in Example 1 except that the second salt was $Na_3PMo_{12}O_{40}.xH_2O$ instead of $H_3PMo_{12}O_{40}.xH_2O$.

Example 8

Example 8 was prepared as described in Example 5 except that the second salt $H_3PW_{12}O_{40}.xH_2O$ was replaced with $Na_3PW_{12}O_{40}.xH_2O$.

Example 9

Ten g of Kuraray GC activated carbon was impregnated with 8 mL of an aqueous solution of 1.2 M $Cu(NO_3)_2$, 0.015M $H_4SiMo_{12}O_{40}.xH_2O$ and 2M $HNO_3$. This mixture was dried in argon at 110° C. for 2 hours. After drying, the impregnated carbon was contacted with 8 mL of a second aqueous solution of 1.2 M $Cu(NO_3)_2$, 0.015 M $H_4SiMo_{12}O_{40}.xH_2O$ and 2M $HNO_3$. This doubly impregnated carbon was dried in argon at 110° C. for 1 hour, followed by 200° C. for 2 hours.

Example 10

Impregnated activated carbon of the invention was produced by contacting an activated carbon with an impregnating solution and drying the mixture at elevated temperature. Activated carbon, type 12×35 Kuraray GC available from Kuraray Chemical Co. was used as the substrate. A solution for impregnation was prepared by mixing a first salt, an aqueous solution that was 1.71 M $Cu(NO_3)_2$ and 0.016 M $H_3PMo_{12}O_{40}.xH_2O$ was impregnated into a sample of the carbon at a ratio of 1 g of the carbon to 0.7 mL of the solution. The impregnated carbon was dried in an argon atmosphere for 2 hours at 120° C.

Example 11

Kuraray GC activated carbon was impregnated using two different impregnation solutions in a two step process. The first solution of 0.032 M $H_3PMo_{12}O_{40}.xH_2O$ in water. The activated carbon and first solution were combined in a ratio of 1 g:0.7 mL. This mixture was dried in an inert atmosphere for 2 hours at 120° C. This dry, impregnated carbon was further impregnated with an aqueous solution of 3.42 M $Cu(NO_3)_2$ at a ratio of 1 g of carbon to 0.7 mL of the impregnation solution. The twice impregnated carbon was dried in an argon atmosphere for 2 hours at 120° C.

Example 12

A sample of Kuraray GC activated carbon was impregnated with an aqueous solution of mixed salts in a ratio of 1 g to 0.8 mL. The impregnation solution was 0.9M $Cu(NO_3)_2$, 0.02M $H_3PMo_{12}O_{40}.xH_2O$, and 0.4M $CuCl_2$ in water. The impregnated carbon was dried in an argon atmosphere at 200° C. for 2 hours.

Example 13

Kuraray GC activated carbon was impregnated with an aqueous solution of two salts in a ratio of 1 g to 0.75 mL. The impregnation solution was 1.7 M $Cu(NO_3)_2$ and 0.02 M $H_3PMo_{12}O_{40}.xH_2O$ in water. The impregnated carbon was dried in an argon atmosphere at 200° C. for 2 hours.

Example 14

Ten (10) g Kuraray GC activated carbon was contacted with 8 mL of an aqueous solution that was 0.7M $Cu(NO_3)_2$, 0.2M $Fe(NO_3)_3.9H_2O$, 0.3M $CuCl_2$ and 0.02M $H_3PMo_{12}O_{40}.xH_2O$. This mixture was dried in argon at 200° C. for 2 hours followed by additional drying for 1 hour at 120° C. in air.

The samples of Examples 1-14 were challenged with vapors or gases using the test methods described above. The test results are shown below in Table 1 along with test results from reproduced Examples from U.S. Pat. Nos. 5,492,822 and 7,309,513.

TABLE 1

| | | Dry Breakthrough Test Results | | | | |
|---|---|---|---|---|---|---|
| Patent or | Weight % loading | Breakthrough time (min.) | | | | |
| Example # | (±2%) | $C_6H_{12}$ | $SO_2$ | $NH_3$ | HCN | NCCN |
| C1[1] | ~30 | 118 | 52 | 64 | 78 | 63 |
| C2 U.S. Pat. No. 7,309,513 | ~ | 87 | 53 | 100 | 67 | 24 |
| 1 | 20 | 152 | 50 | 77 | 63 | 60 |
| 1b | 20 | 161 | 50 | 76 | 63 | 65 |
| 2 | 22 | 129 | 40 | 102 | 49 | 36 |

TABLE 1-continued

Dry Breakthrough Test Results

| Patent or Example # | Weight % loading (±2%) | Breakthrough time (min.) | | | | |
|---|---|---|---|---|---|---|
| | | $C_6H_{12}$ | $SO_2$ | $NH_3$ | HCN | NCCN |
| 3 | 13 | 115 | 54 | 64 | 52 | 52 |
| 4 | 21 | 119 | 65 | 90 | 54 | 50 |
| 5 | 31 | 135 | 70 | 89 | 65 | 57 |
| 6 | 22 | 130 | 92 | 75 | 62 | 56 |
| 7 | 21 | 161 | 71 | 82 | 73 | 68 |
| 8 | 23 | 127 | ~ | 75 | 68 | 54 |
| 9 | 19 | 110 | 65 | 85 | 63 | 62 |
| 10 | 18 | 137 | 82 | 93 | 63 | 30 |
| 11 | 34 | 112 | 95 | 152 | 98 | 27 |
| 12 | 13 | 176 | 40 | 73 | 44 | 36 |
| 13 | 14 | 146 | 47 | 38 | 49 | 49 |
| 14 | 12 | 135 | 43 | 60 | 38 | 33 |

[1] Calgon URC, commercially available from Calgon Carbon Company, Pittsburgh, PA, USA.

TABLE 2

Wet Breakthrough Test Results

| Patent or Example # | Breakthrough time (min.) | | | | |
|---|---|---|---|---|---|
| | $C_6H_{12}$ | $SO_2$ | $NH_3$ | HCN | NCCN |
| C1[1] | 19 | 212 | 303 | 107 | 90 |
| 1 | 15 | 158 | 256 | 71 | 60 |
| 1b | 15 | 146 | 260 | 79 | 60 |
| 3 | 3 | 142 | 187 | 52 | 41 |
| 4 | 10 | 148 | 212 | 74 | 55 |
| 12 | 28 | 154 | 164 | 41 | 27 |
| 13 | 27 | 173 | 147 | 63 | 57 |
| 14 | 22 | 141 | 135 | 33 | 22 |

[1] Calgon URC, commercially available from Calgon Carbon Company, Pittsburgh, PA, USA.

TABLE 3

Dry-wet Breakthrough Test Results

| Patent or Example # | $C_6H_{12}$ Breakthrough time (min) |
|---|---|
| C1[1] | 81 |
| 1 | 66 |
| 1b | 71 |
| 3 | 81 |
| 4 | 60 |
| 12 | 110 |
| 13 | 99 |
| 14 | 100 |

[1] Calgon URC, commercially available from Calgon Carbon Company, Pittsburgh, PA, USA.

The results set forth above demonstrate that activated carbon substrates impregnated according to the invention without using ammonia or ammoniacal solutions can remove both acidic gases such as $SO_2$ and basic gasses such as $NH_3$ as well as HCN and organic vapors such as cyclohexane.

This invention may take on various modifications and alterations without departing from its spirit and scope. Accordingly, this invention is not limited to the above-described but is to be controlled by the limitations set forth in the following claims and any equivalents thereof.

This invention also may be suitably practiced in the absence of any element not specifically disclosed herein.

All patents and patent applications cited above, including those in the Background section, are incorporated by reference into this document in total. To the extent there is a conflict or discrepancy between the disclosure in such incorporated document and the above specification, the above specification will control.

What is claimed is:

1. A method of making an air filter, which method comprises:
    (a) providing an aqueous solution that contains one or more of a first water soluble copper salt and that has a pH less than 8;
    (b) providing an aqueous solution that contains one or more of a second water soluble salt that includes a polynuclear anion that contains molybdenum, tungsten, or a combination thereof, which aqueous solution has a pH less than 8;
    wherein the aqueous solution that contains the first water soluble copper salt may be the same or different from the aqueous solution that contains the second salt; and
    (c) contacting a substrate with the one or more of the aqueous solutions such that (1) copper and (2) molybdenum or tungsten or a combination thereof become impregnated onto the substrate.

2. The method of claim 1, further comprising (d) heating the contacted substrate.

3. The method of claim 2, wherein the substrate is heated to at least about 80 degrees Celsius.

4. The method of claim 3, where in the substrate is heated in an inert atmosphere.

5. The method of claim 1, wherein the water soluble copper salt is copper nitrate.

6. The method of claim 5, wherein the second salt comprises phosphomolybdate anion.

7. The method of claim 5, wherein the second salt comprises silicomolybdate anion.

8. The method of claim 5, wherein the second salt comprises phosphotungstate anion.

9. The method of claim 5, wherein the second salt comprises silicotungstate anion.

10. The method of claim 6, wherein no ammoniacal solution or ammonium salt is used to impregnate copper, molybdenum, or tungsten onto the substrate.

11. The method of claim 1, wherein the solution that contains the one or more first copper salt is substantially free of a copper ammine complex.

12. The method of claim 1, wherein the pH of the aqueous solution(s) is less than 7.

13. The method of claim 1, wherein the first or second solution contains nitric acid.

14. The method of claim 1, wherein the substrate comprises activated carbon.

* * * * *

UNITED STATES PATENT AND TRADEMARK OFFICE
CERTIFICATE OF CORRECTION

PATENT NO. : 8,293,333 B2  
APPLICATION NO. : 12/552367  
DATED : October 23, 2012  
INVENTOR(S) : Lisa M Croll Page 1 of 2

It is certified that error appears in the above-identified patent and that said Letters Patent is hereby corrected as shown below:

Column 3
Line 2, delete "et," and insert -- et. --, therefor.
Line 48, delete "substrate" and insert -- substrate. --, therefor.
Line 62, delete "polyoxometallates" and insert -- polyoxometalates --, therefor.

Column 4
Line 28, delete "wetability" and insert -- wettability --, therefor.
Line 29, delete "wetability," and insert -- wettability, --, therefor.

Column 6
Line 54, delete "polyoxometallates" and insert -- polyoxometalates --, therefor.
Line 58, delete "polyoxometallate" and insert -- polyoxometalate --, therefor.

Column 7
Line 18, delete "polyoxometallate" and insert -- polyoxometalate --, therefor.
Line 23, delete "silicotugstate" and insert -- silicotungstate --, therefor.
Line 31, delete "at" and insert -- at at --, therefor.
Line 31, delete "at" and insert -- at at --, therefor.
Line 33, delete "and or" and insert -- and/or --, therefor.
Line 34, delete "at" and insert -- at at --, therefor.
Line 34, delete "at" and insert -- at at --, therefor.

Column 12
Line 4, delete "$C_6H_{12}$Breakthrough" and insert -- $C_6H_{12}$ Breakthrough --, therefor.

Column 13
Lines 63-64, delete "phophotungstic" and insert -- phosphotungstic --, therefor.

Signed and Sealed this
Twenty-sixth Day of February, 2013

Teresa Stanek Rea
*Acting Director of the United States Patent and Trademark Office*

CERTIFICATE OF CORRECTION (continued)
U.S. Pat. No. 8,293,333 B2

Column 14
Line 6, delete "phophomolybdic" and insert -- phosphomolybdic --, therefor.

Column 18
Line 34, in Claim 4, delete "where in" and insert -- wherein --, therefor.